United States Patent [19]

Schröder

[11] Patent Number: 4,645,314

[45] Date of Patent: Feb. 24, 1987

[54] REFLECTOR TELESCOPE WITH UPRIGHT IMAGE

[75] Inventor: Wolfgang Schröder, Wöllstein, Fed. Rep. of Germany

[73] Assignee: Jos Schneider Ptiische Werke Kreuznach GmbH & Co KG, Kreuznach, Fed. Rep. of Germany

[21] Appl. No.: 676,041

[22] Filed: Nov. 29, 1984

[30] Foreign Application Priority Data

Nov. 30, 1983 [DE] Fed. Rep. of Germany ....... 3343219

[51] Int. Cl.⁴ .................... G02B 17/00; G02B 21/00; G02B 23/06
[52] U.S. Cl. .................................................. 350/504
[58] Field of Search ................ 350/504, 505, 619, 622

[56] References Cited

U.S. PATENT DOCUMENTS

| | | | |
|---|---|---|---|
| 2,413,286 | 12/1946 | Buchele | 350/505 |
| 3,674,334 | 7/1972 | Offner | 350/505 |
| 4,025,783 | 5/1977 | Fletch et al. | 350/504 |
| 4,226,501 | 10/1980 | Shafer | |
| 4,395,095 | 7/1983 | Horton | |

FOREIGN PATENT DOCUMENTS

| | | |
|---|---|---|
| 0005705 | 12/1979 | European Pat. Off. |
| 278799 | 8/1912 | Fed. Rep. of Germany |
| 3343219 | 2/1985 | Fed. Rep. of Germany |
| 819827 | 10/1937 | France |
| 190465 | 4/1937 | Switzerland |
| 677982 | 8/1952 | United Kingdom |
| 2119117 | 11/1983 | United Kingdom |

OTHER PUBLICATIONS

McCarthy, *Space Telescope Optical Telescope Assembly*, 1980, IEEE, 486–90.
Brown *Gleanings for ATM's*, Jun. 1956, Sky and Telescope, 369–72.

Primary Examiner—John K. Corbin
Assistant Examiner—Vincent J. Lemmo
Attorney, Agent, or Firm—Karl F. Ross; Herbert Dubno

[57] ABSTRACT

A reflector telescope with upright image having a principal mirror constructed as a concave mirror, wherein in the path of the light rays between the principal mirror and a concave reversing mirror a collector mirror and a folding mirror are arranged, so that in addition foldings occur at the principal mirror and the reversing mirror of a reflector telescope of the Gregorian type. The image ray path in the reflector telescope is folded twice between the concave principal mirror and the reversing mirror as well as twice between the reversing mirror and the principal mirror. Thereby an extraordinarily compact configuration of the light ray path is achieved and as a result a reflector telescope with reduced overall dimensions, reduced weight and diminished type-conditioned image aberrations is created.

18 Claims, 7 Drawing Figures

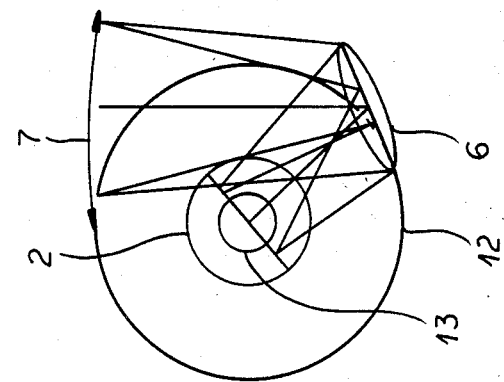
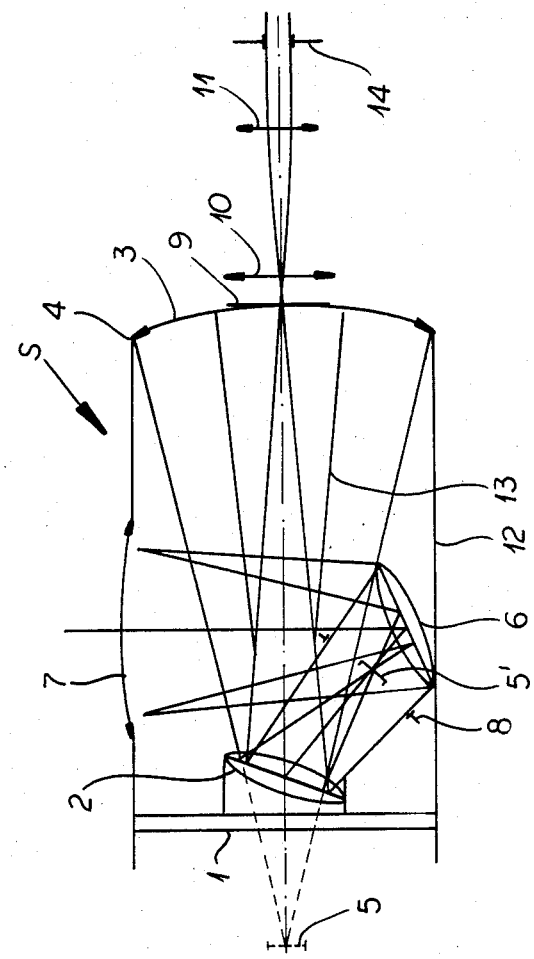

REFLECTOR TELESCOPE WITH UPRIGHT IMAGE

FIELD OF THE INVENTION

The invention relates to a reflector telescope with an upright image with a concave main collector mirror for use preferably in medium to high-degree magnification.

BACKGROUND OF THE INVENTION

There are known binoculars and telescopes which consist of objectives and inversion systems for image erection. The objectives can be constructed of refracting lenses can comprise mirrors and the inversion systems are commonly constructed as lenses or prismatic inversion systems.

Further, a large number of reflector telescopes of different construction are known to be used for astronomical purposes.

The basic different types are:
the Newtonian telescope with reversed image,
the Cassegrainian telescope with reversed image, and
the Gregorian telescope with upright image.

Binoculars and telescopes with objectives made of lenses for medium or high-degree magnification could be constructed considerably shorter after the invention of the teleobjective; besides, in the past due to the use of prismatic inversion systems the systems have been either somewhat shorter and therefore wider, or still relatively long and therefore based on direct vision.

In the case of telescopes with lens inversion systems very tall construction necessarily results.

Since teleobjectives, especially due to the requirements of correcting the chromatic aberrations and of reducing the height of the construction, are made of a plurality of lenses, this type of construction including the prismatic inversion systems or the lens reversion systems has a cumbersome total weight meaning that binoculars or telescopes for medium or high-degree magnification cannot be comfortably carried around for a long time when traveling.

In the case of reflector telescopes such as the Newton telescope or the Cassegrain telescope, lens reversal systems or prismatic reversed systems are needed for the reversion of the image.

In contrast to the already-mentioned telescope types, the Gregorian telescope provides directly an upright image. This is possible because a real reversed intermediary image produced by the main mirror is reproduced by the collector mirror used as a reversal system, as an upright, real intermediary image.

Essential advantages of the Gregory telescope consist therefore of the upright image, the achromatic quality of the mirror and the relatively reduced weight. As disadvantages can be mentioned the relatively considerable over-all length and the short focal distance of the collector mirror in dependence upon the typical image ratio of $\beta = -4$, which is unfavorable for the image quality. This because the sum of the focal distances of the main mirror must and the object distance of the reversing mirror be approximately equal to the image distance of the reversing mirror. This strong secondary magnification of the first intermediary image leads to an increase in image distortion of the main mirror and, on the other hand, even when the main mirror is parabolically shaped and the reversing mirror is elliptically shaped, additional strong extra-axial image distortions occur, due to the considerable ellipticity of the reversing mirror determined by the image proportion $\beta = -4$. This, in addition to the relatively large over-all length, is regrettable for the Gregorian telescope, since otherwise it allows for a very light telescope construction because of the reduced number of components. A modification of the mirror focal distance is not possible in the Gregorian telescope, because the sum of the focal distance of the main mirror and the object distance of the reversing mirror must be approximately equal to the image distance of the reversing mirror.

The disadvantages of the known reflector telescopes are, therefore, that they either must have additional lens of prismatic reversing systems for image erection for ground observation (terrestrial observation), or have relative large over-all construction lengths or type-conditioned image aberrations.

OBJECTS OF THE INVENTION

The object of the invention is therefore to provide a reflector telescope with reduced over-all length, reduced weight and fewer type-conditioned image aberrations thereby eliminating the mentioned disadvantages.

SUMMARY OF THE INVENTION

According to the invention, this object is achieved with further optical means ensuring that the path of light rays coming from the object is foldable more than twice, preferably by folding the ray path twice between the principal collector mirror and a reversing mirror. Since in a Gregorian telescope the ray path is already folded twice by means of the principal concave mirror and the reversing mirror, this additional double folding of the ray path leads to an extraordinarily compact configuration of the light ray path.

This is accomplished by providing in the light path a collecting mirror and a folding mirror arranged between the concave principal mirror and a concave reversing mirror.

Advantageously, the reversing mirror is a concave mirror and the collector mirror and the folding mirror are plane mirrors.

Because of the arrangement of the reversing mirror, the collector mirror and the folding mirror in the path of the light rays and with respect to the tube of the telescope the image ray path in the reflector telescope can be folded a total six times, namely twice between the concave principal mirror and the reversing mirror and twice between the reversing mirror and the principal mirror, in addition to the folds at the principal mirror and the reversing mirror corresponding to the folds in the Gregory telescope.

According to the invention the diameter of the reversing mirror can be increased since it does not obstruct the path of the light rays. The focal distance can be lengthened with a typical image size in the range of $\beta = -2.3$ to $\beta = -3.5$, preferably between $\beta = -2.5$ and $\beta = -3.3$.

The enlargement of the reversing mirror is advantageous for increased field of view and the typical value of the image size means a reduced ellipticity of the reversing mirror and thereby reduced image aberrations and also a reduced further amplification of the image aberrations of the principal concave mirror. The fact that the reversing mirror can be constructed larger with respect to the principal mirror and its focal distance can be lengthened is also advantageous due to the reduced amplification of aberrations on the reachable angle of image and in the sense of reducing the amplification of image aberrations in the principal mirror.

While in the Gregorian telescope the maximum field of vision reaches approximately 40%o, in the reflector telescope according to the invention it reaches approximately 67%o.

The image quality that can be reached is clearly improved by providing a parabolically shaped principal concave mirror and an elliptical reversing mirror.

The rectilinear conformation of the light ray path in connection with the compact construction of the reflector telescope according to the invention, its reduced weight and the improvement of its optical characteristics widens the field of application.

Particularly, the rectilinear configuration of the light ray path favors use of the system for binocular vision.

Advantageously the folding mirror and/or the reversing mirror are arranged at a small distance from or tangentially to the cylindrical portion of the reflector telescope wall. In accordance with the invention, they extend as little as possible or not at all into the parallel light ray path defined by the main concave mirror.

An intermediate image produced by the main concave mirror can lie in the vicinity of the collecting mirror.

The intermediary image produced by the main concave mirror can be reproduced by the reversing mirror into a second, real, upright intermediate image in the vicinity of the principal mirror translucent in its central area, which image can be infinitely reproducible from the ocular.

Advantageously the real image of the entrance pupil or aperture, defined by the frame of the main concave mirror, can be generated in the vicinity of the first real intermediate image, but in the reversed ray path beyond the reversing mirror. The real (pupillar) intermediate image can be reproduced via the ocular in a real exit pupil.

Means for the protection against infiltrated light can be provided, such as an opaque conical tube in the shape of a frustoconical casing, which can be attached centrally with respect to the axis of the telescope tube via an optical lens cemented to the principal concave mirror or which can be mounted on the principal mirror by any other mechanical means.

Advantageous embodiments of the principal concave mirror and the reversing mirror are for instance the cases when the principal mirror and the reversing mirror are constructed as spherical surface mirrors, when the principal mirror and the reversing mirror are constructed as Mangin type mirrors or when the principal mirror is constructed as a parabolical surface mirror and the reversing mirror as an elliptical surface mirror.

For the purpose of focusing, of sharp adjustment of the reflector telescope to the respective object, the reversing mirror can be movable in the direction of its optical axis. This way the internal focusing can be carried out.

Also, the reversing mirror, the collecting mirror and the folding mirror can be built as rigidly interconnected parts of a structure group, which in turn is slidable for the purpose of focusing in the direction of the optical axis of the principal concave mirror within the tube of the reflector telescope.

Focusing is also possible by making the ocular movable in the direction of the optical axis of the light ray path with respect to the principal concave mirror.

For binocular vision two reflector telescopes according to the invention can be connected to form a reflector binocular. This way a handy reflector binocular with reduced dimensions and weight can be produced with reduced optical effort. Thereby, the optic system according to the invention affords the choice to construct with considerable cost savings reflector binoculars of very small dimensions as well as of larger construction. The expense for the mechanical supports is relatively small.

In addition, the reflector telescope according to the invention can be used as an amateur reflector telescope or as a teleobjective for cameras.

BRIEF DESCRIPTION OF THE DRAWING

Further features and advantages of the invention will become apparent from the following description with reference to the attached drawing which shows:

FIG. 1 a schematic representation of an embodiment of the reflector telescope according to the invention, with folded light ray path in a vertical projection on a plane parallel to the optical axis of the principal mirror and parallel to the optical axis of the reversing mirror, FIG. 2 a schematic representation of the reflector telescope represented in FIG. 1 in a projection on a plane perpendicular to the optical axis of the principal mirror, FIG. 3 a binocular embodiment of a reflector telescope according to the invention using two component reflector telescopes in accordance with FIG. 1 in a real embodiment in vertical projection on a plane parallel to the optical axis of the principal mirror and perpendicular to the optical axis of the reversing mirror, FIG. 4 a binocular embodiment of the reflector telescope represented in FIG. 3 in a projection on a plane perpendicular to the optical axes of both principal mirrors, FIG. 5 a further binocular embodiment of the reflector telescope according to the invention corresponding to the embodiment of FIG. 3 in the same projection as in FIG. 3 but in a reduced scale 1:1;

SPECIFIC DESCRIPTION

Figure 4:
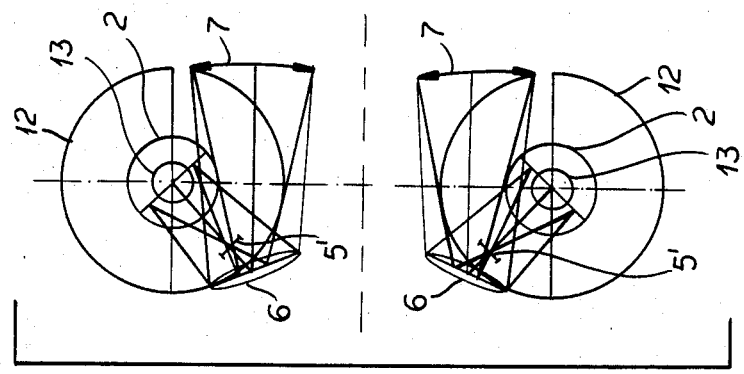

FIG. 1 shows in a schematic representation an embodiment of the reflector telescope S according to the invention in a projection on a plane of a longitudinal section containing the optical axis of the principal mirror and FIG. 2 shows the same reflector telescope in projection on a cross sectional plane.

The reflector telescope according to the invention is related as to function to the terrestrial lens telescope and the classical Gregorian telescope. In the case of the terrestrial lens telescope, the refractive power of the objective and the refractive power of the reversing system are achieved through refractive lenses; in the case of the Gregorian telescope both are achieved through concave mirrors.

The reflector telescope according to the present invention is distinguishable from the classical Gregorian telescope by a double folding of the light ray path between the principal and reversing mirrors with the aid of two plane mirrors, whereby, with regard to the size of the field of vision and the image quality a new degree of freedom is achieved as to the diameter and the focal distance of the reversing mirror.

According to FIG. 1, the light coming for instance from an infinetely remote axial object point (from left according to FIG. 1) can first pass through a non-refractive anti-pollution plane-parallel plate 1, which according to the embodiment—also see now FIG. 2—carries in its central portion the collector mirror 2, and then falls on a principal mirror 3 built as a concave mirror situated at the rear end of the telescope housing (tube) 12, this principal mirror having for instance a diaphragm index of 2.0 and the boundary defining the entry pupil 4 the light ray path being then collected in the direction of the focal point of the principal mirror 3, the site of the first real intermediate image. Before the light reaches the location of the intermediate image 5, the light ray paths are deflected by a collector mirror 2, whose diameter (in the projection on a plane perpendicular to the axis) corresponds to approximately 2/5 of the diameter of the telescope housing 12, this deflection taking place at an angle of approximately 60° with respect to the optical axis of the principal mirror 3; then, after passing the location of the first real intermediate image 5', the light ray path hits the plane folding mirror 6, which is only slightly inclined with respect to the telescope housing 12, this mirror deflecting again the path of the light rays and thereby the optical axis, so that it runs almost perpendicular to the optical axis of the principal mirror 3, but laterally displaced.

After this double folding of the light ray path by the collector mirror 2 and the folding mirror 6, the light reaches the reversing mirror 7 which is laterally shifted with respect to the longitudinal sectional plane of the telescope housing 12 by approximately half of its diameter, so that the optical axis reflects itself.

As a result, the light ray path retraces its course first to the folding mirror 6, located in the vicinity of the wall of the telescope housing 12 and from there, after running through a real intermediate image of the entry pupil 8, is focused by the collector mirror 2 in the direction of the optical axis of the principal mirror 3 to form the second real upright image 9 in the vicinity of the principal mirror 3, which image is observed through an ocular consisting in principal of the field lens 10 and the eyelens 11. The ocular is of the usual multilens construction for the angle of view. The refracting power of the field lens 10 decides the location of the real exit pupil 14. An opaque conical tube 13 in the shape of a frustoconical casing serves as a protection means or shield against infiltrated light.

In comparison with the Gregorian telescope, due to the arrangement of the collector mirror 2, the folding mirror 6 and the reversing mirror 7 in the path of the light rays and with respect to the telescope housing 12, the image ray path is folded six times in the reflector telescope S (in the Gregorian telescope only two times), and namely twice between the principal mirror 3 and the reversing mirror 7, twice between the reversing mirror 7 and the principal mirror 3, in addition to the folding that takes place at the principal mirror 3 and the reversing mirror 7 corresponding to the folding in the Gregorian telescope.

In this embodiment of the reflector telescope according to the invention, the presence of the anti-contamination plane-parallel plate 1 within the optical system according to the invention is not absolutely necessary. It represents here only a sealing device against dirt penetration and can therefore be constructed as a plane-parallel, non-refractive glass plate. It can also be noted at the same time to carry the collector mirror 2 mounted appropriately thereon. The principal mirror at the rear end of the telescope housing directed towards the eye of the user is a concave mirror. The principal mirror 3 is annularly covered with a reflecting coating only in the area outwardly of the frustoconical casing 13. In order to avoid stress, the central portion of the principal mirror 3 is not perforated but integrated in the optical correction system as a refracting lens. Through the diffracting radius of the lens in the central portion of the principal mirror 3 it is possible, if needed, in cooperation with a further lens to provide a focal-distance increasing effect in accordance with the principle of the Barlow lens (see FIG. 7). The diameter of this central translucent area equals approximately 2/5 of the diameter of the (entire) principal mirror 3.

The principal mirror 3 is centrally and rigidly fastened at the end of the telescope housing over the rim 4. The rear surface of the principal mirror 3 directed towards the eye of the user can be in its central portion, in accordance with the optical requirements, either plane or ball-shaped (spherical).

With respect to the path of the light rays, on the other side of the principal mirror 3, the ocular consisting of the field lens 10 and the eye lens 11 is mounted. The location of the second upright seal intermediate image 9 is between the principal mirror 3 and the eye lens 11. It is reproduced, as it appears at infinity, by the ocular 10, 11.

The optical axes of the principal mirror 3 and the ocular 10, 11 coincide, being thus centered with respect to each other.

The collector mirror 2 and the folding mirror 6 are preferably constructed as plane-surface mirrors, in order to eliminate aberrations which would occur in spherical surfaces. In the optical sense, therefore, the light ray path remains axially symmetrical.

Further, the collector mirror 2 is preferably an elliptical collector mirror with regard to its boundaries; it is rigid except when it is part of a slidable construction group, to which will be referred in greater detail later. The perpendicular to the collector mirror 2 is inclined by approximately 60° with respect to the optical axis of the principal mirror 3.

The plane folding mirror 6 is rigidly mounted, except when it is part of a slidable construction group, which will be referred to later.

The reversing mirror 7 is constructed as collecting concave mirror. The optical axis of the reversing mirror 7 can be perpendicular to the axis of the principal mirror 3. In the embodiment shown in FIG. 1, the reversing mirror 7 is laterally displaced with respect to the perpendicular plane containing the optical axis of the principal mirror by approximately half of its diameter. This arrangement of the reversing mirror mirror has the purpose to maintain such a short distance between the collector mirror 2 and the frontal opening of the protection cone 13 as to eliminate the possibility of light infiltrations coming from the object side passing the collector mirror and the inner space of the protection cone 13, thus reaching the second real intermediate image 9. The angle made by the collector mirror 2 and the folding mirror 6 necessarily derives from the afore-mentioned arrangement of the reversing mirror 7.

In FIG. 1, the folding mirror 6 and the reversing mirror 7 are almost tangential to the telescope housing 12, or in other words, they extend as little as possible into the parallel path of the light rays as defined by the principal mirror 3. Also when it comes to binocular embodiments, the space required by the reversing mirror 7 outside the telescope housing 12 does not create any disadvantages. The reversing mirror 7 constructed as a concave mirror can be movable in the direction of its optical axis. (in the course of this motion, no tilting is allowed, since the image would become inclined to the optical axis). Due to the movability of the reversing mirror 7 in the direction of its optical axis an inner focusing for the distance adjustment takes place in the telescope housing 12.

The collector mirror 2, the folding mirror 6 and the reversing mirror 7 can also be rigidly connected to each other forming a construction group which is slidable within the telescope housing 12 in the direction of the optical axis of the principal mirror 3. With the aid of this group the user can make sharp adjustments of the respective distance of an object, through focusing.

Also for the purpose of focusing, the ocular 10, 11 can be made movable in the direction of the optical axis of the path of the light rays so that the focusing can be done by moving the ocular in axial direction with respect to the principal mirror 3.

The size of the mirror surfaces of the principal mirror 3, the collector mirror 2, the folding mirror 6 and the reversing mirror 7 is determined by taking into consideration the field of vision selected for the construction, whereby one can use for this purpose as auxiliary means a representation of the light ray path in evolute form.

The spacings of the mirrors with respect to each other is determined when the diameter of the principal mirror 3, or its aperture ratio is established and sets the diameter of the telescope housing 12. If the path of the light ray is here also represented in evolute form, then the reversing mirror 7 is located somewhere in the middle between the principal mirror 3 and the second real upright intermediate image 9 in front of the ocular 10, 11. The distance between the folding mirror 6 and the reversing mirror 7 is approximately indicated by the diameter of the telescope housing 12. The distance between the collector mirror 2 and the folding mirror 6 is in a projection on a telescope cross section basically somewhat larger than the radius of the telescope housing 12. The collector mirror 2 with elliptical rim is centered to the optical axis of the principal mirror, but inclined to the degree required to avoid that the light ray path between the collector mirror 2 and the folding mirror 6 and the light ray path between the folding mirror 6 and the reversing mirror 7 is not being vignetted due to the protection cone 13.

The radius of the principal mirror is equal to the double of its focal distance. The focal distance of the reversing mirror is calculated according to the formula $$f = \frac{OO'}{\left(2 - \beta - \frac{1}{\beta}\right)},$$

wherein OO' is given by the sum of the distances of the reversing mirror 7 from the object and the image and $\beta$ being equal to the image dimension of the reversing mirror 7.

The image dimension of the reversing mirror 7 lies in the range of $\beta = -2.3$ to $\beta = -3.5$, preferably in the range of $\beta = -2.5$ to $\beta = -3.3$.

Since the reversing mirror does not obstruct the path of the light rays, it is possible to increase its diameter as well as to lengthen the focal distance of the reversing mirror. The possible increase in the size of the reversing mirror is advantageous for the size of the field of vision and the typical value of the image size in the range of $\beta = -2.5$ up to $\beta = -3.3$ means a reduced ellipticity of the reversing mirror and thereby reduced image aberrations as well as subsequent smaller amplification of the image aberrations of the principal mirror 3.

Advantageous embodiments of principal mirror 3 and reversing mirror 7 are offered when the principal mirror 3 and the reversing mirror 7 are spherical surface mirrors, the principal mirror 3 and the reversing mirror 7 are Mangin-type mirrors or the principal mirror 3 is a parabolic surface mirror and the reversing mirror 7 is an elliptical surface mirror.

The conical tube 13 in the shape of a frustoconical casing is opaque and serves for protection against light infiltration. It extends from the principal mirror 3 into the telescope housing 12 and can be fastened to the principal mirror 3 centrally to the median longitudinal axis of the telescope housing 12; it can be cemented to the principal mirror 3 via an optical lens or attached to the principal mirror 3 in any suited mechanical manner. The inclination of the casing surface of the conical tube 13 from the principal mirror 3 to the optical axis (respectively the median longitudinal axis of the telescope housing 12) is approximately given by a straight line running through the focal point of the principal mirror 3 to the center of the intermediate image 5. The conical tube 13 seen from the eye of the user extends from the principal mirror 3 to the intersection of the conical tube 13 with the marginal rays of the median pencil of rays between the collector mirror 2 and the principal mirror 3 up to the area next to the light ray path between the folding mirror 6 and the reversing mirror 7.

The magnification V of the reflector telescope S is given by the formula $$V = -(f_1 \cdot \beta / f_3),$$

wherein
$f_1$ is the focal distance of the principal mirror 3 and $f_3$ the focal distance of the ocular 10, 11.

On the other hand, the diameter of the exit pupil 14 is the quotient of the diameter of the principal mirror 3 and the magnification V.

Figure 7:
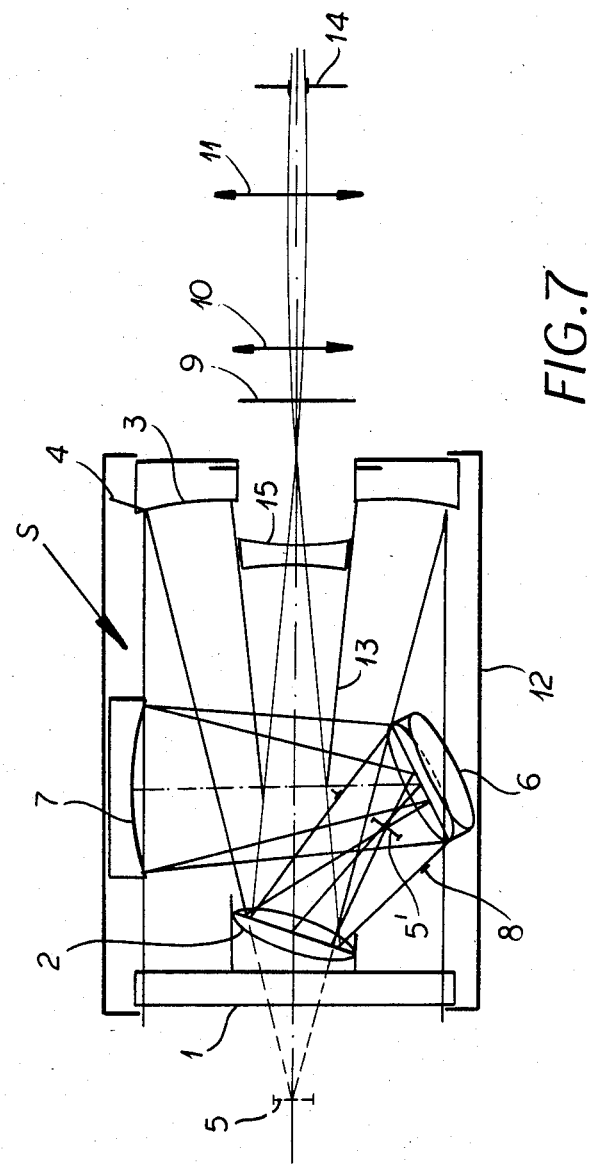
FIG. 7 shows an embodiment similar to FIG. 1 with a Barlow lens.

The total focal distance of the reflector telescope S resulting from the concave principal mirror 3 and the reversing mirror 7 can be lengthened substantially by a subsequently added Barlow lens 15 as seen in FIG. 7.

To the optical system basically consisting of concave principal mirror 3 and the reversing mirror 7 a lens system with variable image size can also be added.

Further, the reversing mirror 7 can be cardanically suspended to be tiltable, with the aid of motorized means and sensor control, around two axes, perpendicular to each other and perpendicular to the optical axis of the reversing mirror 7 for the compensation of the tilting motions of the reflector telescope with respect to the eye of the observer.

Figure 3:
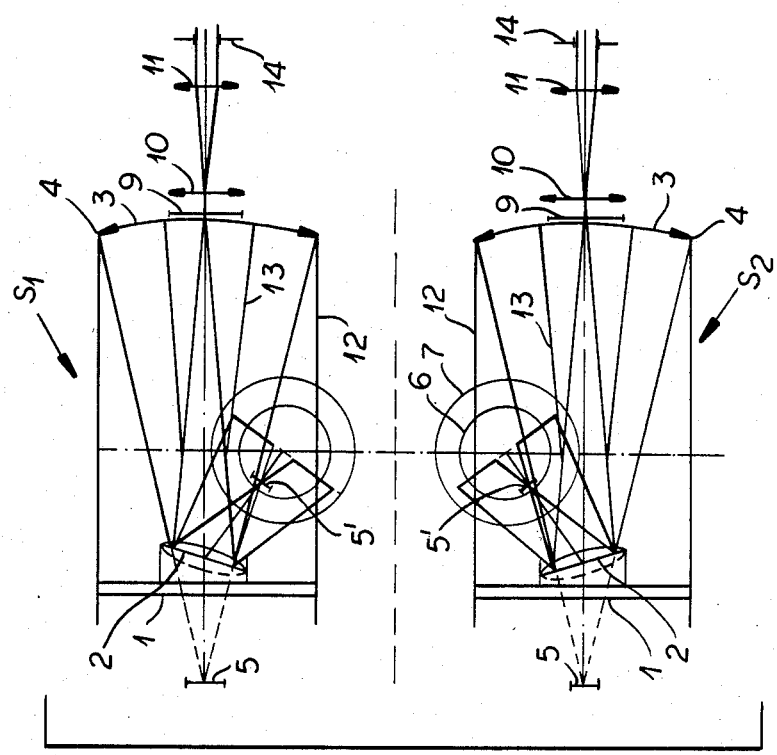
Figure 5:
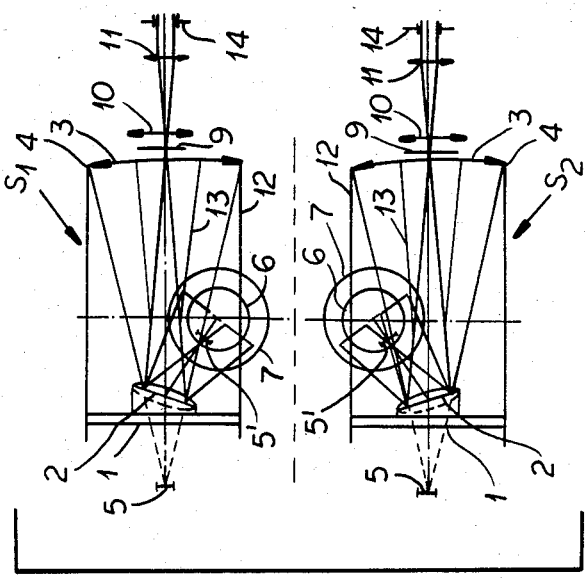

The drawing according to FIGS. 3 and 4 and FIG. 5 show in schematic representation binocular embodiments, in each of them two reflector telescopes ($S_1$, $S_2$) are connected into a reflector binocular for binocular vision with, in both cases (FIG. 3, FIG. 4 and FIG. 5) with a tenfold magnification.

FIGS. 3 and 4 show a binocular $S_1$, $S_2$ for binocular vision at a scale 1:1 of an actual embodiment. The construction of each of these reflector telescopes corresponds to the construction of the reflector telescope S in FIGS. 1 and 2 and therefore similar parts in FIGS. 3 and 4 are marked with the same reference numerals as in FIGS. 1 and 2. In the case of the reflector binocular according to FIGS. 3 and 4 the interpupillar distance in the normal one of 62 mm and the diameter of the exit pupil is of 3.5 mm, almost as the one in the common 8×30 field-glass magnifier. In comparison with a field-glass magnifier with a prismatic reversing system and tenfold magnification the advantageous dimensions appear clearly.

The fact that in the drawing the two reflector telescopes $S_1$ and $S_2$ are shown one on top of the other makes possible a top-view projection and a cross-sectional projection of a reflector telescope. Both reflector telescopes $S_1$ and $S_2$ each of them corresponding to one eye of the user are symmetrically of identical construction, whereby the upper reflector telescope $S_1$ corresponds to the right eye and the lower telescope $S_2$ to the left one of the user. In this embodiment, both reversing mirrors 7 which are larger than the folding mirrors 6 are located in the vicinity of the theoretical median usage position (with the bridges connecting the two reflector telescopes) of the reflector binocular, so that the rim of the reversing mirror which extends somewhat beyond the cylindrical housing 12 of the telescope does not influence its appearance. The light ray paths in the partial telescopes $S_1$, $S_2$ are axially symmetrical in the optical sense.

Also in the case of such a reflector binocular for binocular vision focusing is possible. The reversing mirror 7 of both reflector telescopes $S_1$, $S_2$, in the aforedescribed arrangement, can be arranged so that their focusing movements run parallel, facilitating thereby the use of particularly simple mechanical means.

The necessary adjustments of the reversing mirror 7 are very small, because the influence on the position of the second real intermediate image is a function of the square of the size of the partial image of the reversing mirror 7.

A further focusing possibility existing in the reflector binocular is created by the fact that each construction assembly comprising the reversing mirror 7 and also the collector mirror 2 and the folding mirror 6 is slidable in the direction of the optical axis of the principal mirror 3 relatively to the principal mirror 3.

Finally, the oculars can also be displaced relatively to each of the principal mirrors 3 for the purpose of focusing.

In addition to FIGS. 3 and 4 the above description can also make reference to the FIGS. 1 and 2.

Figure 6:
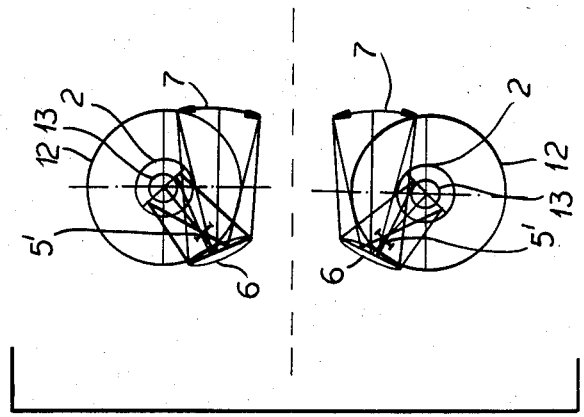
FIG. 6 a further binocular embodiment of the pair of reflector telescopes represented in FIG. 5 in a view corresponding to FIG. 4, but in reduced scale 1:1.

In FIGS. 5 and 6 also an embodiment of a reflector binocular consisting of two reflector telescopes $S_1$, $S_2$ for binocular vision and tenfold magnification in day light is shown and namely at a scale 1:1 an embodiment taken from the practice, from which it becomes clear how compact and handy this type of construction can be. The representation of FIGS. 5 and 6 is scaled down by a factor 1.4 in comparison to FIGS. 3 and 4. Otherwise, in FIGS. 5 and 6 the same parts are marked with the same reference numerals as in FIGS. 3 and 4, so that reference can be made to the embodiments of FIGS. 3 and 4 and further to the embodiments of FIGS. 1 and 2.

The reflector telescope according to the invention can therefore be used especially in optical systems for binocular vision, but also in the field of the amateur reflector telescope, whereby the upright image is very much appreciated by the amateur. Further, the use as a teleobjective for photographic cameras appears advantageous.

The large number of foldings of the light ray path in the reflector objective according to the invention as part of the reflector telescope creates the possibility for very reduced typical overall dimensions of approximately 30% of the total focal distance. When used as a micro-image objective, an approximate focal distance of 600 mm can be achieved with a construction height of 180 mm.

When the reflector telescope according to the invention is used as an amateur telescope with a 50 to 100-fold magnification in a monocular instrument the reduced constructive dimensions are very advantageous due to the reduced weight and the comparatively small space requirement derived therefrom.

The magnification of the reflector telescope can be increased for binocular observation during day light because of the normal pupillar distance of 62 mm up to approximately 25-fold magnification, when an exit pupil diameter of approximately 2 mm is sufficient. This results forcibly in the case of the construction with rectilinear vision.

Special binocular constructions for twilight vision are limited to ten- to twelve-fold magnification because of the required diameter of approximately 5 mm of the exit pupil.

I claim:

1. A reflector telescope with an upright image, comprising:
    an annular concave mirror oriented along an optical axis of the telescope and receiving light rays from an object;
    a collector mirror positioned along said optical axis between said concave mirror and an entrance opening of said telescope for receiving light rays reflected from said concave mirror, said collector mirror being inclined to said optical axis for directing rays reflected therefrom to one side of the telescope;
    a folding mirror at least one side of said telescope positioned to receive rays reflected from said collector mirror and inclined to said optical axis such that a bundle of rays reflected from said folding mirror are trained upon an opposite side of the telescope and said bundle is centered on a folding axis extending perpendicularly to said optical axis but laterally offset therefrom;
    a concave reversing mirror on said opposite side of the telescope positioned to receive said bundle and reflect rays therefrom convergingly to said folding mirror and thence to said collector mirror, whereby said collector mirror reflects the latter rays along said optical axis through said annular concave mirror; and
    an ocular disposed along said optical axis behind said annular concave mirror for viewing of a real upright image of said object.

2. The reflector telescope defined in claim 1 wherein said folding mirror and said collector mirror are each planar mirrors, further comprising a frustoconical opaque shield converging toward said annular concave mirror and surrounding reflected rays from said collector mirror along said optical axis of said ocular.

3. The reflector telescope defined in claim 2 wherein said reversing mirror and said folding mirror are disposed substantially at a wall of said telescope extending from said annular concave mirror to said entrance opening.

4. The reflector telescope defined in claim 2 wherein said concave reversing mirror is so oriented that a real image of said object is formed by reflected rays from said folding mirror toward said collector mirror at a location between said collector mirror and said folding mirror.

5. The reflector telescope defined in claim 2 wherein said annular concave mirror is a spherical surface mirror.

6. The reflector telescope defined in claim 2 wherein said concave reversing mirror is a spherical surface mirror.

7. The reflector telescope defined in claim 2 wherein said annular concave mirror is a Mangin-type mirror.

8. The reflector telescope defined in claim 2 wherein said concave reversing mirror is a Mangin-type mirror.

9. The reflector telescope defined in claim 2 wherein said concave annular mirror is a parabolical surface mirror.

10. The reflector telescope defined in claim 2 wherein said concave reversing mirror is an elliptical surface mirror.

11. The reflector telescope defined in claim 2 wherein said concave reversing mirror is mounted so as to be movable parallel to said folding axis.

12. The reflector telescope defined in claim 2 wherein said reversing mirror, said collector mirror and said folding mirror are mounted in a common support movable along said optical axis.

13. The reflector telescope defined in claim 2 wherein said ocular is movable along said optical axis.

14. The reflector telescope defined in claim 2 wherein an assembly formed by said mirrors and said ocular is duplicated along two parallel optical axes for binocular vision.

15. The reflector telescope defined in claim 2 wherein said collector mirror is formed as a plane mirror carried by a nonrefractive meniscus lens.

16. The reflector telescope defined in claim 2 wherein said collector mirror is mounted on a plane-parallel plate disposed at said entrance opening.

17. The reflector telescope defined in claim 2 wherein said ocular includes a field lens and an eye lens, a second real image of said object being formed between said annular concave mirror and said field lens.

18. The reflector telescope defined in claim 2, further comprising a Barlow lens disposed in the path of rays reflected from said collector mirror along said optical axis to said ocular.

* * * * *

UNITED STATES PATENT AND TRADEMARK OFFICE
CERTIFICATE OF CORRECTION

PATENT NO. : 4,645,314

DATED : 24 February 1987

INVENTOR(S) : Wolfgang SCHRODER

It is certified that error appears in the above-identified patent and that said Letters Patent is hereby corrected as shown below:

On the Title Page:

Item [73] Assignee's name is to read:

--Jos. Schneider Optische Werke
  Kreuznach GmbH & Co. KG --.

Signed and Sealed this

Twenty-fifth Day of August, 1987

Attest:

DONALD J. QUIGG

Attesting Officer

Commissioner of Patents and Trademarks